United States Patent
Koch et al.

(10) Patent No.: US 11,718,711 B2
(45) Date of Patent: Aug. 8, 2023

(54) METHOD AND FACILITY FOR PRODUCING POLYLACTIDE (PLA) FROM A LACTIDE MIXTURE BY MEANS OF POLYMERIZATION

(71) Applicant: Reinhard Koch, Gröditz (DE)

(72) Inventors: Reinhard Koch, Gröditz (DE); Dirk Berthel, Rosswein (DE); Joachim Müller, Frankenberg (DE)

( * ) Notice: Subject to any disclaimer, the term of this patent is extended or adjusted under 35 U.S.C. 154(b) by 98 days.

(21) Appl. No.: 17/418,332

(22) PCT Filed: Feb. 18, 2020

(86) PCT No.: PCT/DE2020/100113
§ 371 (c)(1),
(2) Date: Jun. 25, 2021

(87) PCT Pub. No.: WO2020/177810
PCT Pub. Date: Sep. 10, 2020

(65) Prior Publication Data
US 2022/0064370 A1     Mar. 3, 2022

(30) Foreign Application Priority Data
Mar. 4, 2019 (DE) .................... 10 2019 105 335.8

(51) Int. Cl.
*C08G 63/08*     (2006.01)
*B29C 48/92*     (2019.01)
(Continued)

(52) U.S. Cl.
CPC ............ *C08G 63/08* (2013.01); *B29C 48/022* (2019.02); *B29C 48/44* (2019.02); *B29C 48/92* (2019.02);
(Continued)

(58) Field of Classification Search
USPC ........................................................ 524/878
See application file for complete search history.

(56) References Cited

U.S. PATENT DOCUMENTS

2014/0296399 A1    10/2014   Tsuboi et al.

FOREIGN PATENT DOCUMENTS

DE          19720916 A1    11/1998
DE      102017005998 A1    12/2018
(Continued)

OTHER PUBLICATIONS

Machine-generated translation of Detailed Description of WO 2019/115002 A1, retrieved from ESPACENET on Jun. 2, 2023 (Year: 2019).*
(Continued)

*Primary Examiner* — Fred M Teskin
(74) *Attorney, Agent, or Firm* — Mindful IP PLLC; Michael J. McCandlish (57) ABSTRACT

A method and a facility produce polylactide (PLA) by polymerization, in which a lactide mixture is mixed with at least one catalyst, is introduced into a modular planetary roller extruder and the finished PLA is then removed. The lactide mixture continuously passes through segments of the extruder. The course of the reaction is measured and controlled in the segments in a targeted manner such that the temperature can be set by heating and/or cooling. The pressure can be variably set depending on pressure values to be checked by a controllable gas extraction and/or a controllable extruder speed and/or static variability of the planetary rollers and/or a variable metering speed of the lactide mixture and/or a variable mixing ratio of the lactide mixture. Flammable gas is removed in an explosion-protected zone in a partial region of the extruder. Additives are introduced into the extruder during the rolling process.

10 Claims, 4 Drawing Sheets

(51) Int. Cl.
    *B29C 48/00*      (2019.01)
    *B29C 48/44*      (2019.01)
    *C08G 63/78*      (2006.01)

(52) U.S. Cl.
    CPC .. *C08G 63/785* (2013.01); *B29C 2948/92019* (2019.02); *B29C 2948/92209* (2019.02); *B29C 2948/92514* (2019.02); *B29C 2948/92704* (2019.02)

(56) References Cited

FOREIGN PATENT DOCUMENTS

| | | | |
|---|---|---|---|
| DE | 102017006638 A1 | 1/2019 | |
| EP | 0737219 B1 | 3/1999 | |
| EP | 0768485 B1 | 4/2000 | |
| EP | 2209832 B1 | 4/2012 | |
| WO | 2009141139 A1 | 11/2009 | |
| WO | WO 2019/115002 A1 * | 6/2019 | ............ B29C 48/44 |

OTHER PUBLICATIONS

International Search Reort for PCT/DE2020/100113 dated Jul. 14, 2020 With English Translation.
Written Opinion of the International Searching Authority for PCT/DE2020/100113.

\* cited by examiner

METHOD AND FACILITY FOR PRODUCING POLYLACTIDE (PLA) FROM A LACTIDE MIXTURE BY MEANS OF POLYMERIZATION

CROSS-REFERENCE TO RELATED APPLICATIONS

This application is a national stage of, and claims priority to, Patent Cooperation Treaty Application No. PCT/DE2020/100113, filed on Feb. 18, 2020, which application claims priority to German Application No. DE 10 2019 105 335.8 filed on Mar. 4, 2019, which applications are hereby incorporated herein by reference in their entireties.

TECHNICAL FIELD

The disclosure relates to a process and a facility for producing polylactide (PLA) by polymerization as per the preamble of claim 1, wherein continuous production of in-specification PLA is carried out in such a way that an environmentally-friendly material which conforms to customer requirements and has precisely defined properties can be produced continuously from the starting components in a precisely controlled process, optionally with addition of further materials.

BACKGROUND

Polylactides (PLA), commonly also referred to as polylactic acids, are synthetic polymers of the polyester type. They are made up of many lactic acid molecules which are chemically bound to one another. These polymers which are optically active due to the asymmetric carbon atom usually occur in the form of D- or L-lactides.

Polylactides are obtainable by, in particular, the ionic polymerization of lactide, a cyclic condensate of two lactic acid molecules. Polylactides are produced by ring-opening polymerization. At temperatures in the range from 140 to 180° C. and in the presence of catalytic tin compounds (e.g., tin octoate), ring-opening polymerization takes place. Polymers having a high molar mass and strength are produced in this way. Lactide itself can be produced by fermentation of molasses or by fermentation of glucose by means of various bacteria. In addition, high molecular weight and pure polylactides can be produced directly from lactic acid by polycondensation. However, the disposal of the solvent is problematical in industrial production.

The ring-opening polymerization of dilactide to form polylactide is known. The polymerization of lactic acid to give high molecular weight lactic acid is of subordinate importance. Organic tin compounds (dioctoates) are usually employed because they are readily soluble in the monomer and in the polymer and are approved by, for example, the FDA (U.S. Food and Drug Administration). The polymerization starts in the melting tank with a reaction time of about 2-5 hours. The temperature- and shear-sensitive PLA is transferred at a different point in time, depending on the manufacturer, during processing up to about 220° C. into a twin-screw extruder. The removal or neutralization of the catalyst takes place in this extruder. Residual monomer present is removed in order to obtain a processing-stable PLA.

Initial experiments on an at that time practicable production process were reported in the thesis: "Darstellung von Polylactiden mittels reaktiver Extrusion", Fakultät für Verfahrenstechnik und technische Kybernetik der Universität Stuttgart, 2000, presented by Sven Jacobsen from Esslingen am Neckar on Dec. 22, 1999. In the present study, the technology of reactive extrusion, which is known per se, has for the first time been applied to a slow polymerization reaction. The publication describes a process concept for the alternative preparation of polylactide from the cyclic dimer of lactic acid, namely lactide, by means of which polylactides are to be produced. A closely intermeshing, corotating twin-screw extruder is used here as polymerization apparatus.

Unfortunately, this concept has been found to be unsatisfactory for continuous production of PLA, as a result of which the extruder had virtually no productivity. Small uncontrolled amounts of PLA were produced in the process, but with uncontrollable, nonuniform quality.

EP 0 786 485 B1 describes a continuous process for activated anionic lactam polymerization. The individual process steps are introduction of lactam and also catalyst and activator for the anionic lactam polymerization under water-free conditions into a heatable continuously operating mixing and transport device. The lactam is heated to the process temperature with continuous mixing of the melt and at least partial polymerization. This is followed by continuous shaping in a tool or discharge of the melt as extrudate, cooling and pelletization. The introduction of activator and catalyst into a water-free lactam melt is affected by continuous feeding-in of a liquid system in which the activator and catalyst are present together and which is liquid at room temperature, with the liquid system being obtainable by reaction of a specific mixture. In the process described, pure, water-free lactam is continuously taken off from a storage container in unmelted form or as melt and fed to a continuously operating transport and melt-mixing apparatus having a plurality of treatment zones, preferably a twin-screw extruder having corotating screws. Thus, either the melt of the lactam is continuously mixed and transported or it is firstly continuously melted, mixed and transported.

In EP 737 219 B 1, a polylactide composition having a good melt strength and elongation is said to be obtained. The intention is to indicate a composition which has a melt strength which is high enough even for films to be produced by conventional processing methods, in particular by blown film processes. A processable polylactide composition having a number-average molecular weight of at least 10 000 is reported, with this being obtainable by reactive extrusion of polylactide with an organic peroxide. This is said to allow film blowing of polylactides using a conventional, commercial film blowing facility. The stabilization of polylactic acid was examined using a Brabender mixer by means of which it is said to have been possible to record the melt viscosity of the compound directly from the rotation of the machine. Blown films having different grades of polylactide were produced by means of a Brabender extruder having a screw diameter of 19 mm and a length of 25 D. The extruder was provided with a blown film die having a diameter of 25 mm and a die intermediate gap of 1.0 mm. The temperature profile in the extruder was set to 170-180-190° C. and in the nozzle to 190° C. The screw speed was set to 30 rpm. The PLA produced is mixed and processed further in the extruder indicated.

EP 2 209 832 B1 describes a process for producing polylactic acids having a high molar mass and a high optical purity by selective catalysis. In at least one process stage, a particulate catalyst and/or a particulate stabilizer which in each case has an average particle diameter of from 1 to 100 nm is/are used in a heterogeneous reaction mixture. A closely meshing, corotating twin screw extruder having internal temperature regulation and torque regulation and having a modular screw in order to be able to match the screw configuration in respect of transport, kneading and backing-up elements flexibly and optimally to the process conditions and end product parameters was used for the continuous bulk polymerization of L,L-dilactide in the form of a reactive extrusion process.

In practical operation, it has been found that twin-screw extruders are unsuitable for the effective production of PLA since these merely bring about melting of the mixtures to be processed. The actual polymerization process is affected by the starting materials and additives used, not by the extruder itself. The function of single-screw or twin-screw extruders, their residence times and the pressures which can be set during passage are unsuitable for effective PLA production.

PLA produced by the known processes fluctuates considerably in terms of its properties. Known processes are not sufficiently controllable in all phases to produce in-specification PLA continuously and reliably. The utility of the product produced in this way is thus extremely limited. Production is usually carried out in uneconomical batch processes, i.e. in bulk processes. The materials properties can be influenced only very unsatisfactorily, or not at all, during the production process. Large quantities obtained all at once have to be processed further immediately.

What is known as the ring-opening process occurs in PLA production. At the beginning of the treatment, the lactate ring opens. That is to say, chemical reactions can take place at the position of opening. This opening occurs in a time window. At a relatively long residence time, for example in a twin-screw extruder, the opening process begins to reverse. That is to say, the starting materials are formed again.

Planetary gear extruders, on the other hand, have hitherto been used only for mixing processes in the plastics industry, in the paint industry for producing paint mixtures, in the chemical industry for producing mixtures with endothermic and exothermic reactions, in the food industry for producing sensitive formulations or for other mixing processes. Even mixtures of materials having high viscosity differences can be processed without problems by means of planetary gear extruders.

One peculiarity is the possible modular construction of the planetary gear extruder. In the modular construction, a plurality of spindle barrels are coupled in series and the process path is thus multiplied or the process technology is matched to the respective requirements. Here, the planetary gear extruder makes it possible, in contrast to other conventional processing extruders, to arrange entire process chains in series. During a process, a plurality of reactions, e.g. devolatilization, injection of liquids or addition of fillers and solid components, can proceed one after the other.

The known planetary gear extruders are utilized for mixing and "normal" extruders melt something. For example, the melt pressure at the end of conventional planetary gear extruders would not be sufficient for extrusion blow molding to be operated performed therewith.

A planetary gear extruder having sensors for measurement of pressure and temperature and also cooling and heating devices for controlling the reactions occurring in the extruder is described, for example, in DE 197 20 916 A1. The planetary gear extruder described is employed for the processing of polymer, which is introduced in pellet form together with additives into the extruder. The feed mixture is plasticized, homogenized, subsequently cooled to extrusion temperature and discharged again in the molten state.

DE 10 2017 005 998 A1 describes a chemical process for flowable feed material in a planetary gear extruder. To increase the residence time, it is proposed that a fixed play of at least 3 mm be provided between the toothed parts or the extruder be extended, with the extension being formed by at least one further planetary gear extruder section or planetary gear extruder module. An increase in the residence time is also said to be able to be achieved by generating a flow directed in the opposite direction to the transport direction of the extruder.

SUMMARY

It is an object of the disclosure to develop a process and a facility, the process steps of which can be controlled and the facility parts of which are arranged so that continuous production of PLA is ensured. The production process should be able to be influenced precisely in terms of all quality-determining parameters in all phases. Furthermore, high-quality products which can be matched at any time in terms of properties to customer requirements should be able to be guaranteed.

A further object of the disclosure is to save primary energy by optimum configuration of the procedures. The excessive consumption of natural resources, such as cotton having a high water requirement, should be reduced by the provision of spinnable PLA. Furthermore, packaging, especially for foods, which are compostable without restriction at low cost, ideally industrially, should be able to be produced. The PLA produced according to the disclosure should be able to be processed further on largely conventional machines and plants.

The object is achieved according to the disclosure by the features of the independent claims. Useful features are described in the dependent claims.

The choice of a suitable planetary gear extruder results from knowledge of the course of reaction of PLA. A plurality of chemical processes proceed in succession in a planetary gear extruder. After introduction of the PLA in liquid form into the reaction space, the chemical reaction of the ring structures occurs in a plurality of steps within a reaction window. Firstly, the ring structure of the PLA opens. This opening persists for a certain time. The structures then close again to form the ring. A reversible reaction thus occurs. The size of the reaction window, i.e. the time thereof, and the steepness of the flanks of the window determine the reaction time available.

It is important to stop the reaction after ring opening within this window. To determine a suitable point in time, all relevant parameters, e.g. the pressures, the temperatures and the consistency of the PLA, have to be measured at a large number of places in the planetary gear extruder. This can occur only when the appropriate measuring instruments and the regulation possibilities have been implemented on the planetary gear extruder and in its interior. Regulation of the residence time of the PLA in the system can be affected via the variability of the speed of rotation of the central gear.

The central gear of the planetary gear extruder is toothed in a helical fashion in many flights. The planetary gears are provided with appropriate teeth and with a significantly smaller diameter compared to the diameter of the central gear. Finally, appropriate teeth are located on the inside of the wall of the housing of the planetary gear extruder, in which the planetary gears roll along and become intermeshed there. The rotary motion of the central gear sets the planetary gears into rotation via the teeth. During this rotational motion, the planetary gears move along the teeth of the wall of the housing in the same rotational direction as the rotational motion of the central gear. The speed of movement of the planetary gears is dependent on the ratio of the diameter of the central gear to that of the planetary gears.

Corresponding to the intended use, the shape of the helical teeth is designed so that material present between the planetary gears is conveyed in a particular direction upon rotary motion of the central gear.

Since the reaction material is introduced in liquid form at the feed conduit for the lactide mixture into the planetary gear extruder in the facility described and is, in the widest sense, discharged in paste-like form at the end of the reaction chain, the tooth spacings in the segments have to be made different. Thus, the gap between helical teeth should be made small in the first segment after introduction into the planetary gear extruder in order to minimize churning losses. With increasing viscosity of the reaction material, these gaps can be increased in the subsequent segments. The teeth carry along material more easily as a result of adhesive effects. In particular the gap dimension should be selected so that the kneading work to be expended is not too large in this region. Heat is generated by intensive kneading work, i.e. internal friction in the feed material and at the tooth flanks. This heat and the heat rising simultaneously from the ring-opening process of the PLA has to be removed in a qualified way from the planetary gear extruder.

In order to realize a thermally very harmonious process sequence required for the intended reactions, cooling or heating has to be installed at places suitable for influencing the temperature in the zones of the segments in the outer housing of the planetary gear extruder. Heating or cooling should also be provided in the central gear for the same effect.

Since, however, temperature changes naturally also bring about pressure changes, an active, flexibly reacting pressure control also has to be implemented. It should be remembered here that the paste-like consistency of the PLA on the tooth flanks results in a certain densifying effect, so that a closed space which can be influenced by pressure is at least temporarily formed within a segment or a zone between the planetary gears moving there.

Heating in the region of the first segment is necessary in order to start, in conjunction with the catalyst, the intended reaction in the lactide mixture.

An advantageous possible way of influencing the reaction rate is selection of the size of the gap between the teeth of central gear, housing teeth and planetary gears. There, a gap in the range from about 0.1 mm to 0.5 mm should be set to avoid kneading and scooping losses of the liquid and be made ever greater backwards in the flow direction as a function of the consistency of the product. Gas can easily escape from the material thickness which becomes very thin there and the catalyst is optimally distributed homogeneously in the PLA. The size of the teeth and thus the number thereof relative to the circumference of the gears in the system determine the size of the reaction areas made available. In contrast to a twin-screw extruder having only one kneading region between the screws, the planetary gear extruder has many kneading regions corresponding to the number of the planetary gears.

Thus, for example, the surface difference is considerable at comparable diameters, tooth dimensions and lengths. The effective surface area in the case of a twin-screw extruder having a system diameter of about 100 mm and a length of 500 mm is about 200 $m^2$, while that of a planetary gear extruder having, for example, 8 planetary gears is about 440 $m^2$. This comparison clearly shows the difference. Furthermore, the distances between the planetary gears themselves decrease greatly in the planetary gear extruder. The axial spacings between the planetary gears are reduced to a minimum level, to such an extent that the gears can just still rotate freely past one another. This design guarantees intensive mixing of the lactate in all regions of the planetary gear extruder. Since the planetary gears in the planetary gear extruder can rest via their teeth on the internal teeth of the extruder housing and thus center the central gear, the forces are uniformly distributed in the geometric system. This results in gaps which can be set precisely in all regions of the tooth pairings.

In the process for producing polylactide (PLA) from a lactide mixture, mainly from D-lactide and L-lactide, by polymerization, the lactide mixture to be processed is introduced into a planetary gear extruder, and mixed with a catalyst and the finished PLA is taken off at the end. The lactide mixture continuously passes through a plurality of segments of a planetary gear extruder having a modular construction. Measurement and targeted control of the reactions proceeding in the planetary gear extruder is carried out in the segments, in such a way that the temperature can be set by heating and/or cooling as a function of temperature values to be tested via sensors. The pressure can be set via a controllable offtake of gas and/or a controllable extruder speed and/or a static alterability of the planetary gears and/or an alterable metering rate of the lactide mixture and/or an alterable mixing ratio of the lactide mixture as a function of pressure values to be tested via sensors. An offtake of gas which poses a fire hazard is carried out in at least one subregion of the planetary gear extruder in an explosion-protected zone. During the rolling process, at least one catalyst is fed directly into the planetary gear extruder. Additives for influencing the final properties are also fed directly into the planetary gear extruder during the rolling process.

The geometry of the planetary gears, the pressures and temperatures in the planetary gear extruder have to be adapted as a function of the reaction window during the progressing treatment in such a way that controllable ring polymerization can take place.

In an example, the lactide mixture passes in the longitudinal direction of the planetary gear extruder through a plurality of zones of a segment of the planetary gear extruder. Measurement and targeted control of the reactions proceeding in the planetary gear extruder is carried out in the zones in such a way that the temperature can be set by means of heating and/or cooling as a function of temperature values to be tested via sensors and/or the pressure can be set via a controllable offtake of gas and/or an altered dimensioning of the planetary gears. Depending on the intended pressure profile in the planetary gear extruder, the diameters of the planetary gears are adapted in such a way that the gaps between planetary gears and the vessel wall are made larger or smaller with progressing treatment time in the flow direction of the material.

In a further example, the lactide mixture passes through a plurality of zones of a segment of the planetary gear extruder within the planetary gear extruder. In the individual zones, measurement and targeted control of the reactions proceeding in the planetary gear extruder are carried out in such a way that the temperature can be set by heating and/or cooling as a function of temperature values to be tested via sensors. Control of the course of the reaction can also be affected by a targeted offtake of gas being able to be set as a function of pressure values to be tested via sensors.

After introduction of one or more catalysts, color and/or fillers (e.g., talc, fibers) can be added as additives to influence the final properties.

Introduction of a neutralizer should preferably be affected directly into the planetary gear extruder toward the end of the process.

The gas which presents a fire hazard from the extraction is passed to disposal or further use. The explosion-protected zone can be supplied with a dry inert gas. A vacuum or at least reduced atmospheric pressure can also be applied. In this way, the explosive gases are diluted to below their ignition limit in this space.

In the facility for carrying out the process of the disclosure, at least one storage container containing a lactide mixture is connected via a feed conduit to the planetary gear extruder. The planetary gear extruder has a modular construction such that it is divided into a plurality of segments each having a plurality of planetary gears running around a central gear. Here, there are intermediate spaces between the individual segments and gaps in each case between the planetary gears and the extruder housing and between the planetary gears and the central gear, into which, optionally, at least one feed conduit for catalysts and/or at least one feed conduit for additives and/or at least one feed conduit for neutralizer and/or at least one offtake for gas which presents a fire hazard opens. The gaps become larger from segment to segment in the flow direction of the material to be treated.

At least one subregion of the planetary gear extruder has an explosion-protected zone from which gas which presents a fire hazard is taken off from the intermediate spaces and/or the gaps. The explosion-protected zone covers the region in which the gases which present a fire hazard are formed and are taken off.

Sensors for acquiring data are arranged on and/or in the planetary gear extruder in each of the segments. Here, sensors for testing temperature values make it possible to influence the temperature in the planetary gear extruder in such a way that the temperature in the segments of the planetary gear extruder can be set by heating and/or cooling. Sensors for testing pressure values make it possible to influence the pressure in the planetary gear extruder in such a way that the pressure in the segments of the planetary gear extruder can be set variably by a controllable extraction of gas and/or a controllable extruder speed and/or a static alterability of the planetary gears and/or an alterable metering rate of the lactide mixture and/or an alterable mixing ratio of the lactide mixture.

The planetary gear extruder is made liquid-tight and gastight. The polylactide formed can be taken off from an outlet opening.

In a particular example, at least one of the segments is divided into a plurality of zones in the longitudinal direction of the planetary gear extruder. Sensors for acquiring data are arranged in each zone. Sensors for testing temperature values make it possible to influence the temperature in such a way that the temperature in the individual zones can be set by means of heating and/or cooling. Sensors for testing pressure values can make it possible to influence the pressure in such a way that the pressure in the segments of the planetary gear extruder can be set variably by means of a controllable offtake of gas and/or a static alterability of the planetary gears.

In a further example, at least one of the segments within the planetary gear extruder is divided into a plurality of zones. Sensors for acquiring data can be arranged in each zone, with sensors for testing temperature values making it possible to influence the temperature in such a way that the temperature can be set in the individual zones by heating and/or cooling. Further sensors for testing pressure values can make it possible to influence the pressure in such a way that the pressure in the zones of the planetary gear extruder can be set variably by means of a controllable offtake of gas.

The explosion-protected zone can be formed by a separate enclosing housing. All components present within the explosion-protected zone should have an explosion-protection design, for example the heating, the measuring instruments or the extraction.

The process steps are arranged in a new way, events are harmonized and appropriate, suitable facilities are used. For the first time, all process- and quality-relevant parameters and data are obtained by means of a plurality of suitable sensors at different but critical places on and in the facilities. These data are processed centrally and serve to control the overall facility. A marketable product can thus be produced economically by means of sensitive and flexible control. Since the outlay in terms of apparatus and the energy consumption are very low compared to processes known hitherto, expansions can be realized easily and inexpensively by duplication of the facilities.

The disclosure makes it possible for the first time to produce PLA having precisely defined properties continuously in an energy-saving way in an ongoing process. The properties can be changed promptly during the production process by targeted alterations in the process parameters or the addition of further materials. The product and production flexibility achieved in this way ensures economical operation of the facility and saves energy.

BRIEF DESCRIPTION OF THE DRAWINGS

The disclosure will be illustrated below with the aid of a working example. The figures show:
FIG. 1 Facility for producing PLA
FIG. 2 Planetary gear extruder
FIG. 3 Schematic section A-A of FIG. 1
FIG. 4 Schematic Section B-B of FIG. 1

DESCRIPTION

The facility is designed for degrading organic trace materials which are difficult to degrade in the production of PLA, using in-situ generation and transfer of hydroxyl radicals, ozone and other species having unpaired bonds to the aqueous phase. The facility is dimensioned for an annual production of from 500 to 1000 t. This from-to range describes the possibility of producing end products having different use properties. The individual components are dimensioned accordingly.

Figure 1:
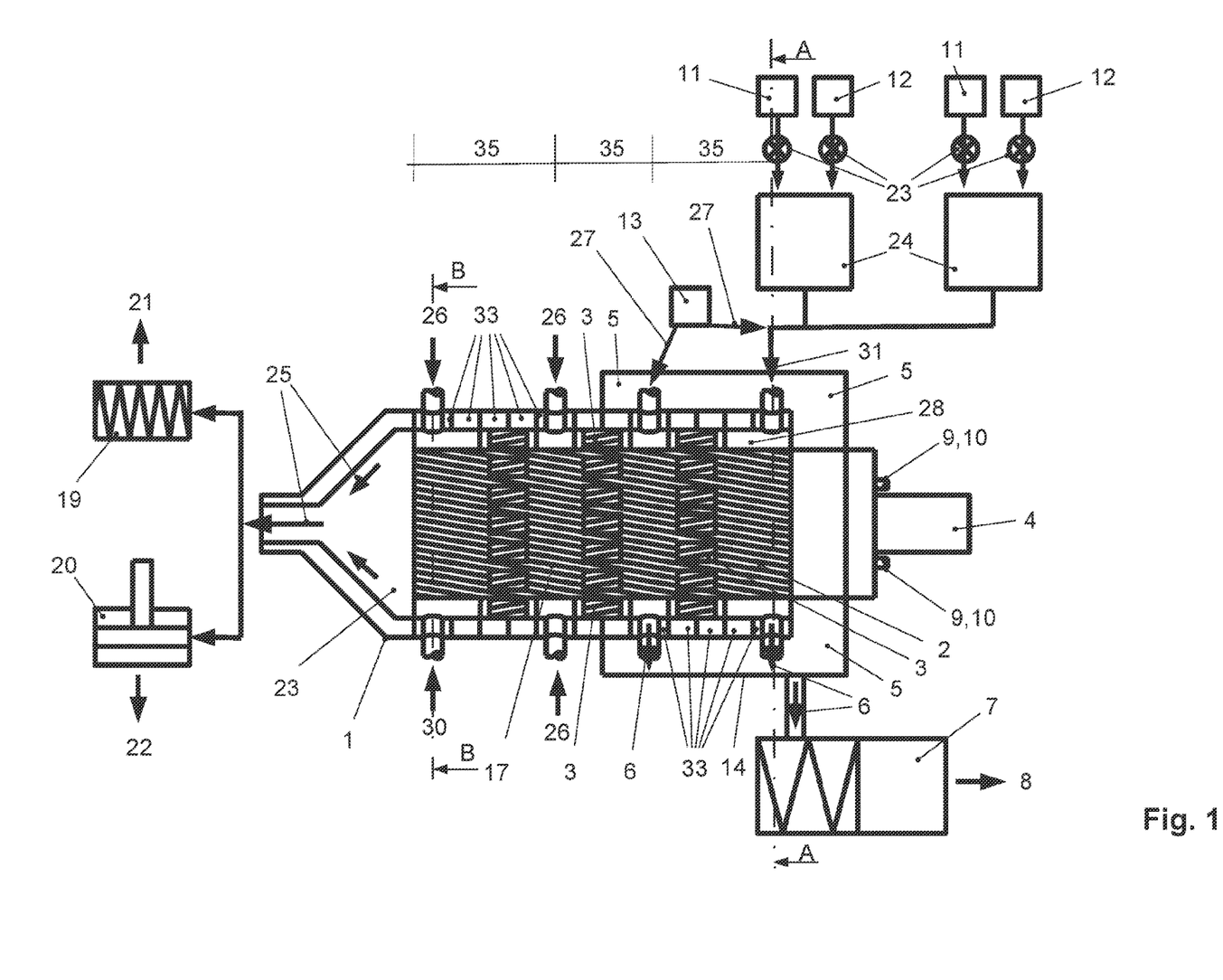
Figure 2:
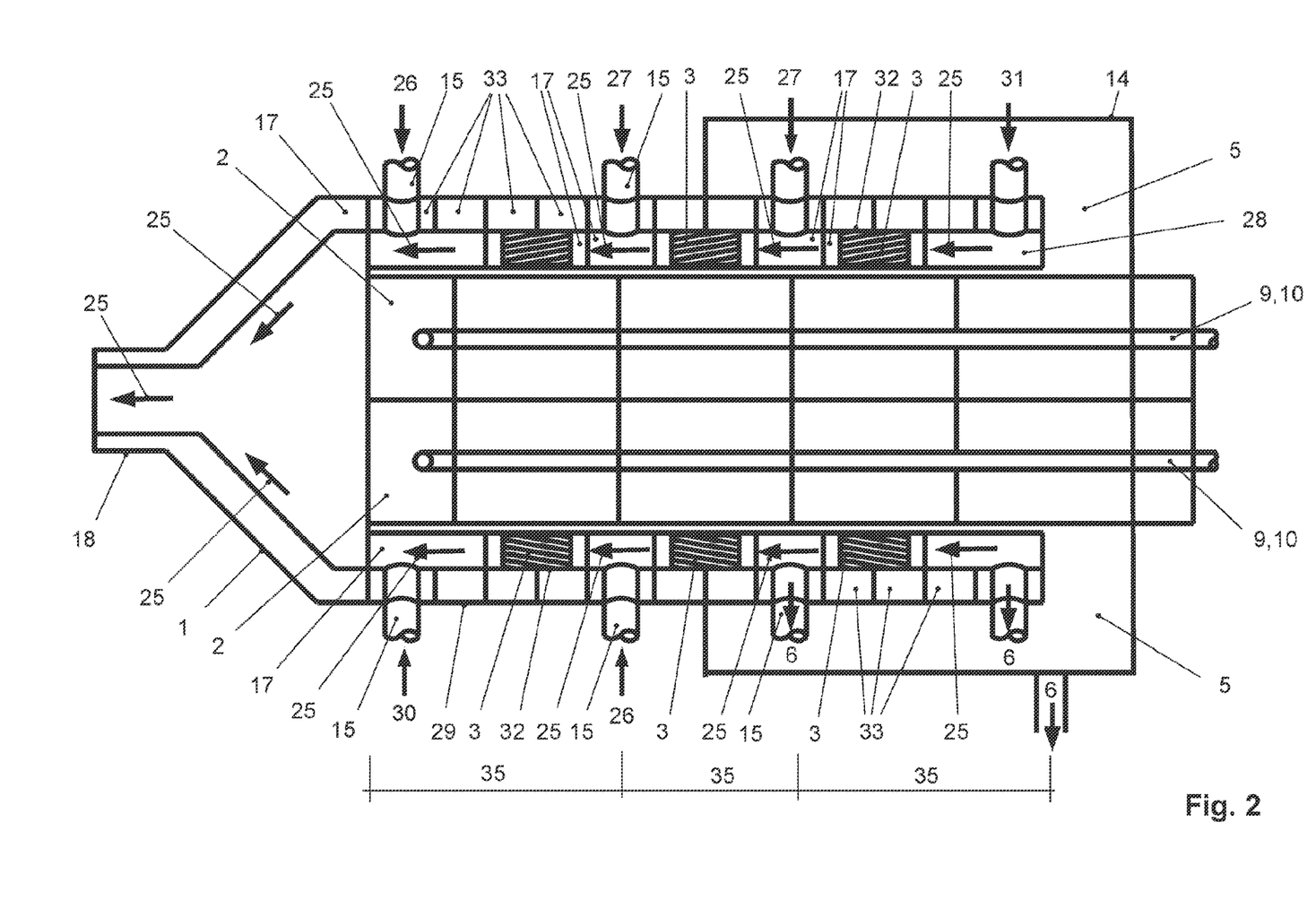
Figure 3:
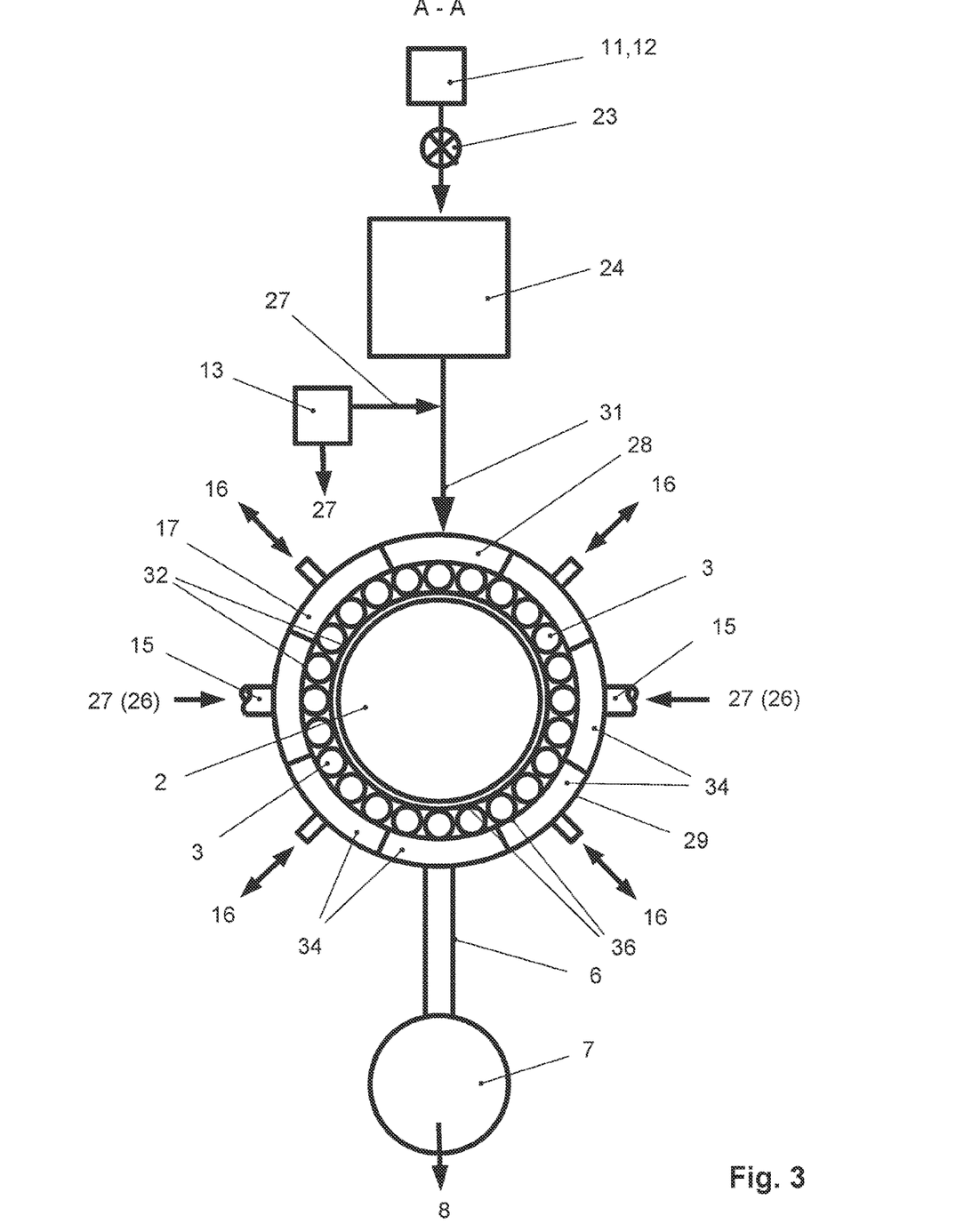
Figure 4:
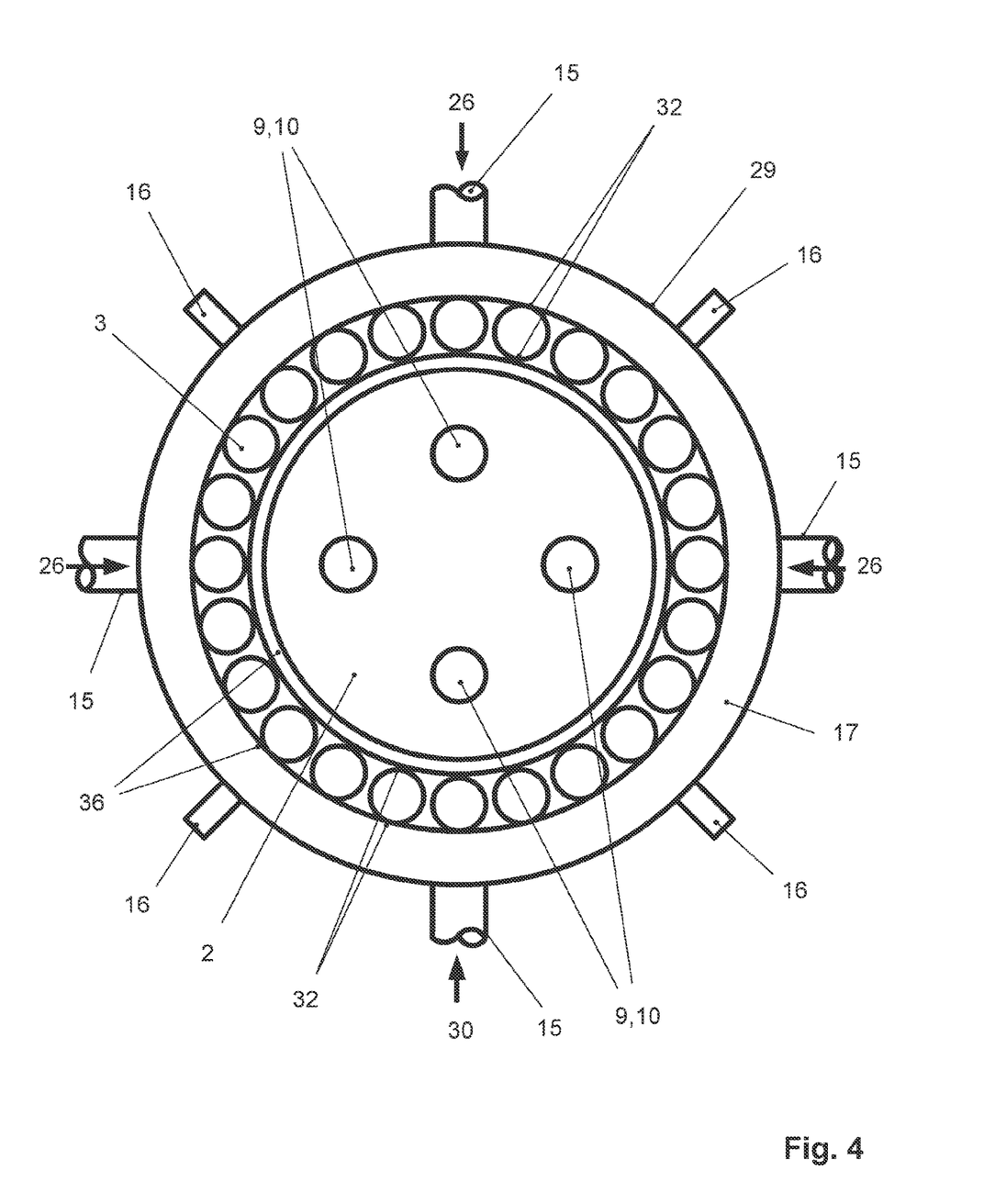

FIG. 1 schematically shows a side view of the facilities with paths for material and process steps for producing PLA. In FIG. 2, the components and technical constituents of the planetary gear extruder 1 used are depicted in side view. FIGS. 3 and 4 show a sectional view of the schematic structure of the planetary gear extruder.

Starting point of the treatment is the facility's two storage containers 24 with integrated cooling, into which D-lactide from storage containers 11 and L-lactide from storage containers 12 are introduced by means of metering devices 23 configured as pumps. Furthermore, a storage container 13 containing a catalyst 27 is provided, with, in the present example, a conduit carrying catalyst 27 opening downstream of the storage container 24 containing the lactide mixture and a plurality of conduits carrying catalyst 27 opening directly into various segments 35 of the planetary gear extruder 1. Each transport pump in the transport path assists the mixing-in of the catalyst and homogenization of the lactide mixture.

To produce PLA, a planetary gear extruder 1, hereinafter also referred to as PGE, in which a plurality of planetary gears 3 move around a central gear 2 driven by means of drive 4 is used as key component of the facility. Means for heating 9 and cooling 10 or temperature control are provided on the central gear 2 and these can continue along the further course of the PGE 1. The geometric dimensioning of the central gear 2 with its integrated heating 9 and cooling 10 facilities is configured so as to correspond to the torsional and frictional forces arising and the force exerted by the drive 4 which is generally configured as electric motor. Excellent rotational speed equilibration is achieved thereby. Thus, a drive power of from 50 kW to 60 kW for the drive of the central shaft is necessary for this dimensioning in order to ensure a stable, constant rotational speed of, for example, 200 rpm.

The diameter of the central gear 2 is here fixed as 800 mm. The diameter of the 24 planetary gears here is in each case 100 mm. The effective surfaces are maximized in this way and the intermediate spaces 17 between the planetary gears 3 are kept small. The gaps 32 between the teeth of central shaft 2 and the teeth of the planetary gears 3 are fixed at 0.1 mm in the first segment in order to increase the efficiency. In the further segments, these gap widths vary between 0.2 and 0.5 mm as a function of the planned consistency and viscosity.

The integrated heating 9 and cooling 10 facilities in conjunction with the thermal regulators in the extruder housing 29 ensure a very finely controllable temperature profile in the treatment process. This control also regulates and harmonizes the partial pressures in the system indirectly. The temperature measurement is carried out up to 400° C. by means of digital measurement. The temperature control of the facility is carried out using 25-30 KW for heating and 60-80 kW for cooling. Pressurized water having a temperature of up to 200° C. and a pressure of up to 10 bar is used as heat transfer medium. This ensures a high effectiveness and reaction rate of the heating and cooling facility.

In the example depicted, the planetary gear extruder 1 has 3 segments. Between the circumferential planetary gears 3, there are intermediates spaces 17, of which at least two serve for offtake 6 of gas which presents a fire hazard from an explosion-protected zone 5 by means of an extraction pump 7. In the explosion-protected zone 5, here the first segment, the offtake 6 of gas is carried out using an appropriately dimensioned pump of about 80-100 m³/h. The drive of this pump is sufficiently rated at 2.0 kW. Reliable offtake of gas and sufficient gas dilution are ensured in this way.

The feed conduit 31 for the lactide mixture to be processed from a storage container 24 leads directly into the first intermediate space 28 between the circumferential gears 3 and the wall of the extruder housing 29.

The sensors 16 for acquisition of data are also installed in the intermediate spaces 17. Further intermediate spaces 17 allow introduction 15 of property-altering additives 26, for example a catalyst 27, a neutralizer 30 or specific fillers and also controlled compression and decompression of the PLA.

The housing walls of the planetary gear extruder 1 have heating and cooling zones which can influence the treatment process and in each case make available the necessary conditions. Heating and cooling zones are likewise present in the interior of the central gear 2. At least part of the planetary gear extruder 1 is explosion-protected with an enclosing housing 14. This region is blanketed with dry inert gas.

The precise control of the addition of a neutralizer 30 for stopping the action of the catalyst 27 is important. This sensitive metering in terms of amount and at the correct point in time critically influences the quality of the end product.

Downstream of the outlet opening 18 of the planetary gear extruder 1 in the flow direction 25 of the material, there is either a pump 19 for transporting the PLA further to immediate further processing 21 or a comminution device 20, for example a chopper with cooling for cold chopping-off, i.e. for producing pellets, with subsequent storage 22.

All technical configurations take into account the fact that pressures of up to about 40 bar can arise during the course of the process in normal operation. To give a safety factor of 4-5, all facility parts are designed for up to 200 bar.

From a storage container 11 containing D-lactide and a storage container 12 containing L-lactide, D-lactide and L-lactide are conveyed in a defined ratio into a storage container 24 and mixed there to give a lactide mixture. The mixing ratio is dependent on the planned end product. The temperature level in the storage containers must not exceed the limit of 220° C. At least part of the catalyst 27 from the storage container 13 is added to the lactide mixture in the feed conduit 31 for the lactide mixture downstream of the storage container 24. The catalyst 27 is readily soluble in monomer and polymer.

From the storage container 24, the lactide mixture is conveyed via a feed conduit 31 into the first intermediate space 28 of the planetary gear extruder 1. In this region, all components introduced are thoroughly mixed and very uniformly distributed to effect homogenization. The feed region is watertight or liquid tight. The lactide mixture introduced has a fluid consistency. An exception can be the consistency of the catalyst. Since the proportion of this in the total volume is small, this different viscosity has only very little influence on the total viscosity of the overall composition. Combustible gases are formed in the subsequent part of the process. For this reason, this takes place in an explosion-protected zone 5. Explosion protection is assisted by introduction of inert gas, either nitrogen or $CO_2$. In a further embodiment, a pressure below atmospheric pressure can be set. As a result, the hazardous gases are diluted to such an extent that they cannot form an ignitable mixture. The gases which present a fire hazard are drawn off via a gas offtake 6 and are passed to further use as energy source or disposal 8.

Since the profiles of the central gear 2 and the planetary gears 3 are designed so that they transport material in the flow direction 25, the PLA is always conveyed from one gear system via the intermediate spaces 17 to the next gear system.

In the first regions, the teeth in the gear system are provided with narrow tolerances in order to minimize kneading and scooping losses. The tooth gaps between the teeth 36 are preferably selected, depending on the diameter of the central gear 2, in a ratio of about 1:1000. Such narrow gaps have a further purpose. They create very large and thin surfaces of the material introduced. These surfaces, which can be imagined as film-like, can thus easily be influenced thermally and can easily degas. These geometrically tight hollow spaces, like the first intermediate space between gears and housing wall, serve to feed the lactide mixture at a number of places within the extruder housing 29 into the explosion-protected zone 5. Thus, intensive mixing and homogenization occurs as early as in this first segment 35.

In the first and also the subsequent segment 35, combustible gases are formed in the facility. These are removed safely by means of gas offtakes 6 which are advantageously distributed over the circumference of the segment 35 and in the longitudinal extension of the housing of the PGE. In addition, at least the first segments 35, in general two, have an explosion-protected design to ensure safe operation.

Further segments 35 adjoin the first segments. These serve a number of different purposes. The gaps between the teeth 36 are here increased to a ratio of about 1:500, corresponding to the increasing viscosity of the feed material. The degree of internal friction increases in the system with increasing viscosity. This must not lead to excessive heating. If this frictional heat which arises were not to be uniformly distributed, chemical reactions could proceed at different speeds at least in regions. Such behavior is undesirable and should be avoided. In these segments, the ring opening process is complete within from about 3 to 15 minutes. The precise reaction time depends on the catalysts 27 used. This ring opening process is reversible, i.e. it has to be deliberately stopped. This occurs by addition of neutralizers 30 which bind the catalyst 27. Intermediate spaces 17 are arranged as relaxation zones in the segments 35 or between the individual segments 35. Sensors for acquiring data 16 to measure temperature and pressure and also connections for cooling or heating and connections as introduction 15 of additives 26 are located in the zones.

The number of segments 35 in this region of the PGE also depends on the type of additives 26 and the proportions of these in the total volume. Catalyst 27 is for the first time finely metered into the first segments 35 of the PGE.

The last segment 35 serves first and foremost for harmonization of the lactide. In it, or in the intermediate space 17 upstream of it, the ring opening reaction is complete. The product is stabilized. This occurs in particular by means of cooling in the zones 33 and 34 around the intermediate space 17 and around this last segment 35. A metering device 23 is located downstream of this last segment 35. It collects the individual exiting streams and passes them to suitable further processing 21 or storage 22.

The intermediate spaces 17 are also necessary for controlling the process and influencing the product quality. Process data for control are derived at these places and desired additional material components are added. The intermediate spaces 17 serve as compression and decompression zones. In addition, the intermediate spaces are structured and divided in such a way that the temperature of individual segments of the intermediate spaces can be controlled very precisely. The control of the temperature is affected via a process control. This control allows targeted heating or cooling of individual intermediate space segments in a programed sequence.

A number of shafts rotate in a planetary gear extruder 1. The dimensions thereof make it possible for them to be used for cooling the reaction space. At the same time, the variously structured internals increase the paths and reaction times in the reaction space. Compressive and shear forces are thus considerably reduced.

To ensure the chosen product quality, one or more planetary gear extruders 1 can be used in series. This technique enables all necessary process parameters to be selected and set in detail, for example the arrangement of compression and decompression zones. The precisely controlled gas offtake 6 for the explosive and flammable gases by means of an extraction pump 7 ensures the necessary process safety. The control of the residence time of the reaction material in the planetary gear extruder 1 is of greatest importance and is critical to the process. Thus, a controlled increase in the residence time to from 10 to 15 times previously customary residence times between integrated cooling and temperature-controlled zones is critical to quality. The polymerization process occurs with a time and spatial offset at least in subregions of the facilities. These conditions are addressed by the specific design of the facility. This highly flexible variability of the process conditions for the first time makes the in-specification production of PLA according to the disclosure possible.

The temperature and shear sensitivity can be addressed by suitable multistage cooling 10 and greater internal transport areas of the many planetary gears 3 with lower specific pressing pressures and friction. Owing to the longer paths in the planetary gear extruder 1 and the resulting increased residence time and the significantly greater internal surface areas, it is possible to achieve faster and better removal of residual monomers. In a PGE, there are geometrically significantly more places for taking off the residual monomers. A plurality of offtake possibilities allows very gentle offtake of monomers, especially very thorough removal thereof. At least one offtake is provided in each segment and each zone.

The product formed can, if desired, be fed immediately to further downstream processes, for example by means of a pump 19. One possibility is to carry out comminution 20 by means of cooled choppers and convey the chopped pieces to storage 22.

This type of production ensures continuous product quality and monitoring. In particular, a qualified continuous temperature control in conjunction with a pre-reactor upstream of the extruder continuously ensures high product quality. The planetary gear extruder 1 and the storage container 24 for the lactide mixture should have an explosion-protection design since the combustible and explosive gases which arise have to be separated and discharged. A protective gas blanket of inert gas ($CO_2$, $N_2$ or Ar) increases process safety.

The overall facility with all upstream and downstream components is controlled by a customary control. This process control measures all process-relevant data with the necessary high speed, evaluates them and, according to the program, controls the details of the manufacturing regime. Accordingly, all control units such as thermometers, manometers, transport pumps and valves are designed for digital control. All relevant process data are displayed clearly on a central display. The advantageous visual depiction of the process events, data and parameters assists understanding for this technology and increases operational reliability.

The change-over times in the case of a change of derivative are considerably shortened when using the continuous process procedure described here and significantly smaller batch sizes can be produced economically than in the bulk process in which catalysts have to be added as early as in the storage container 24. Due to the specific internal geometries and the increase in internal surface areas and the plurality of circumferential planetary gears, the residence time is increased and the material is processed more gently.

LIST OF REFERENCE NUMERALS

1 Planetary gear extruder (PGE)
2 Central gear
3 Planetary gears
4 Drive of the central gear
5 Explosion-protected zone
6 Gas offtake
7 Extraction pump
8 Further processing or disposal of the gas
9 Heating of the central gear and temperature control
10 Cooling of the central gear and temperature control 11 Storage container for D-lactide
12 Storage container for L-lactide
13 Storage container for catalyst
14 Enclosing housing
15 Introduction of additives
16 Sensors for acquiring data
17 Intermediate space
18 Outlet opening
19 Pump
20 Comminution with cooling (chopper)
21 Further processing
22 Storage (granular material)
23 Metering device
24 Storage container containing lactide mixture
25 Flow direction of material
26 Additives
27 Catalyst
28 First intermediate space between gears and housing wall
29 Extruder housing
30 Neutralizer
31 Feed conduit for lactide mixture
32 Gap
33 Zones in longitudinal direction
34 Zones in circumferential direction
35 Segment
36 Teeth

The invention claimed is:

1. A process for producing polylactide (PLA) from a lactide mixture by polymerization, wherein the lactide mixture to be processed is introduced into a planetary gear extruder, and mixed with at least one catalyst and the finished PLA is taken off at an end of the process, comprising:
passing the lactide mixture continuously through a plurality of segments (35) of the planetary gear extruder (1) having a modular construction, wherein measurements and targeted control of the reactions proceeding in the planetary gear extruder (1) are carried out in the segments (35) such that a temperature can be set by heating and/or cooling as a function of temperature values to be tested via sensors for measuring the temperature values and a pressure can be variably set via a controllable offtake of gas and/or a controllable extruder speed and/or a static alterability of the planetary gears and/or an alterable metering rate of the lactide mixture and/or an alterable mixing ratio of the lactide mixture as a function of pressure values to be tested via sensors for measuring the pressure values,
carrying out the offtake (6) of gas which presents a fire hazard at least in a subregion of the planetary gear extruder (1) in an explosion-protected zone (5),
introducing the at least one catalyst (27) directly into the planetary gear extruder (1) during the rolling process, and
introducing additives (26) for influencing the final properties directly into the planetary gear extruder during the rolling process.

2. The process according to claim 1, wherein the lactide mixture passes in a longitudinal direction of the planetary gear extruder (1) through a plurality of zones (33) of a segment (35) of the plurality of segments (35) of the planetary gear extruder (1) and the measurements and the targeted control of the reactions proceeding in the planetary gear extruder (1) are carried out in the zones such that the temperature can be set by heating and/or cooling as the function of the temperature values to be tested via the sensors for measuring the temperature values and/or the pressure can be set via the controllable offtake (6) of gas and/or an altered dimensioning of the planetary gears (3).

3. The process according to claim 1, wherein the lactide mixture passes through a plurality of zones (34) of a segment (35) of the plurality of segments (35) of the planetary gear extruder (1) within the planetary gear extruder (1) and the measurements and the targeted control of the reactions proceeding in the planetary gear extruder (1) are carried out in the zones (34) such that the temperature can be set by heating and/or cooling as the function of the temperature values to be tested via the sensors for measuring the temperature values and/or the controllable offtake (6) of gas can be set as the function of pressure values to be tested via the sensors for measuring the pressure values.

4. The process according to claim 1, wherein color and/or fillers for influencing the final properties are added as the additives (26) after the introduction of the catalyst (27).

5. The process according to claim 1, wherein introduction of a neutralizer (30) is carried out directly into the planetary gear extruder (1) toward the end of the process.

6. A facility for producing polylactide (PLA) from a lactide mixture which is introduced into a planetary gear extruder, mixed with at least one catalyst, and processed according to the method of claim 1, comprising:
at least one storage container (24) containing the lactide mixture connected via a feed conduit (31) to a planetary gear extruder (1),
a liquid-tight and gas-tight planetary gear extruder (1) having a modular construction such that it is divided into a plurality of segments (35) each having a plurality of planetary gears (3) running around a central gear (2), wherein intermediate spaces (17) are present between the individual segments (35) and gaps (32) between teeth of central gear (2) and teeth of planetary gears (3), the gaps (32) increasing in size from segment (35) to segment (35) in a flow direction (25) of the material being processed as a function of the expected consistency of the material being transported, the intermediate spaces being between the planetary gears (3) and an extruder housing (31) and between the planetary gears (3) and the central gear (2),
feed conduits opening into the intermediate spaces (17) and/or gaps (32) for the introduction of catalyst (27), additives (26), and neutralizer (30),
at least one offtake (6) for gas which presents a fire hazard opening into the intermediate spaces (17) and/or gaps (32),
at least one subregion of the planetary gear extruder (1) having an explosion-protected zone (5) from which gas which presents a fire hazard is taken off through an offtake (6) from the intermediate spaces (17) and/or the gaps (32),
sensors (16) for acquiring data arranged on and/or in the planetary gear extruder (1) in each of the segments (35), wherein:
sensors for measuring the temperature values make it possible to influence the temperature in the planetary gear extruder (1) such that the temperature in the segments (35) of the planetary gear extruder (1) can be set by heating (9) and/or cooling (19), and
sensors for measuring the pressure values make it possible to influence the pressure in the planetary gear extruder (1) such that the pressure in the segments (35) of the planetary gear extruder (1) can be set variably by means of a controllable extraction of gas and/or the controllable extruder speed and/or the static alterability of the planetary gears (3) and/or the alterable metering rate of the lactide mixture and/or the alterable mixing ratio of the lactide mixture, and an outlet opening (18) for removing the polylactide formed by the process.

7. The facility according to claim 6, wherein at least one of the segments (35) is divided in a longitudinal direction of the planetary gear extruder (1) into a plurality of zones (33) and the sensors (16) for acquiring the data are arranged in each zone (33), wherein:

the sensors for measuring the temperature values make it possible to influence the temperature such that the temperature in the individual zones (33) can be set by heating (9) and/or cooling (10), and the sensors for measuring the pressure values make it possible to influence the pressure such that the pressure in the segments (35) of the planetary gear extruder (1) can be set variably by the controllable offtake (6) of gas and/or the static alterability of the planetary gears (3).

8. The facility according to claim 6, wherein at least one of the segments (35) within the planetary gear extruder (1) is divided into a plurality of zones (34) and the sensors (16) for acquiring the data are arranged in each zone (34), wherein:

the sensors for measuring the temperature values make it possible to influence the temperature such that the temperature in the individual zones 34 can be set by heating (9) and/or cooling (10), and the sensors for measuring the pressure values make it possible to influence the pressure such that the pressure in the zones (34) of the planetary gear extruder (1) can be set variably by the controllable offtake (6) of gas.

9. The facility according to claim 6, wherein the explosion-protected zone (5) is formed by an enclosing housing (14).

10. The facility according to claim 6, wherein all components present within the explosion-protected zone (5) have an explosion-protection design.

* * * * *